(12) United States Patent
Yahata et al.

(10) Patent No.: US 6,930,646 B2
(45) Date of Patent: Aug. 16, 2005

(54) TRANSPONDER AND ANTENNA

(75) Inventors: Seiro Yahata, Tokyo (JP); Takanori Endo, Omiya (JP); Masami Miyaki, Omiya (JP); Takashi Tsuchida, Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 08/701,457

(22) Filed: Aug. 22, 1996

(65) Prior Publication Data

US 2003/0107523 A1 Jun. 12, 2003

(30) Foreign Application Priority Data

| Aug. 22, 1995 | (JP) | ................................................. 7-213353 |
| Jul. 5, 1996 | (JP) | ................................................. 8-176543 |
| Jul. 5, 1996 | (JP) | ................................................. 8-176544 |

(51) Int. Cl.[7] .......................... H01Q 7/08; G08B 13/14
(52) U.S. Cl. .................. 343/718; 343/788; 340/572.7
(58) Field of Search ................... 343/718, 788, 343/742, 867; 235/491; 340/572, 572.6, 572.7; H01Q 7/00

(56) References Cited

U.S. PATENT DOCUMENTS

| 3,031,667 A | * | 4/1962 | Wennerberg | ................ 343/788 |
| 3,495,264 A | * | 2/1970 | Spears | ........................ 343/788 |
| 3,683,389 A | * | 8/1972 | Hollis | ......................... 343/788 |
| 3,750,180 A | * | 7/1973 | Fujimoto et al. | ........... 343/788 |
| 3,898,565 A | * | 8/1975 | Takeuchi et al. | ............ 343/788 |
| 4,879,570 A | * | 11/1989 | Takizawa et al. | .......... 343/788 |
| 4,937,586 A | * | 6/1990 | Stevens et al. | ............. 343/788 |
| 4,947,179 A | * | 8/1990 | Ganter et al. | ................ 343/718 |
| 5,396,698 A | | 3/1995 | Orthmann et al. | ........... 29/600 |
| 5,408,243 A | * | 4/1995 | D'Hont | ....................... 343/718 |
| 5,567,537 A | * | 10/1996 | Yoshizawa et al. | ......... 343/788 |

FOREIGN PATENT DOCUMENTS

| EP | 0 302 355 | | 2/1989 | |
| JP | 55-11669 | * | 1/1980 | ................. 343/788 |
| JP | 56-134810 | | 10/1981 | |
| JP | 58-94204 | * | 6/1983 | ................. 343/788 |
| JP | 60-233904 | | 11/1985 | |
| JP | 64-54906 | | 3/1989 | |
| JP | 3-64105 | | 3/1991 | |
| JP | 4094502 | | 3/1992 | |
| JP | 6-59046 | | 3/1994 | |
| JP | 6-342065 | | 12/1994 | |

OTHER PUBLICATIONS

Copy of European Patent Office Communication for European Patent Office Application No. 96113479.8 dated Jan. 6, 1997, including European Search Report.

Copy of European Patent Office Notification of European Publication and Information on Application for European Patent Office Application No. 96113479.8 dated Jan. 29, 1997.

Copy of European Patent Office Communication for European Patent Office Application No. 96113479.8 dated Jun. 3, 1997.

*Antennbuch*, Franchkh–Kosmos Verlags–GmbH & Co., Stuttgart 1991, p. 389.

* cited by examiner

*Primary Examiner*—Michael C. Wimer
(74) *Attorney, Agent, or Firm*—Armstrong, Kratz, Quintos, Hanson & Brooks, LLP

(57) ABSTRACT

An antenna for a transponder comprises a magnetic core composed of layered amorphous metallic thin plates or composite plates of soft magnetic flakes and a synthetic resin, and a coil wound on the magnetic core. A transponder comprises two antennas set forth above, and a spiral antenna.

26 Claims, 4 Drawing Sheets

- - - -> AXIS DIRECTION OF ANTENNA

- - - -> AXIS DIRECTION OF ANTENNA

TRANSPONDER AND ANTENNA

FIELD OF THE INVENTION

The present invention relates to transponders and antennas for use therewith. In particular, the present invention relates to an antenna and a transponder operating at a frequency of 40 kHz to 200 kHz, or at a frequency exceeding 100 kHz, which is suitable for the usage of an apparatus carried on a person, such as an ID card, a commuter pass and a coupon ticket.

DESCRIPTION OF THE RELATED ART

Antennas which have previously been used in the prior art include those of a winding on a ferrite magnetic core, and those of a wound conductor without a magnetic core. In antennas used in alternating magnetic fields, the use of the magnetic core comprising layered thin plates prevents eddy losses resulting from currents.

When a prior art antenna is used for transponders carried on persons for ID cards, commuter passes and coupon tickets, the following problems arise:

Because ferrite is hard, and unflexible, it is not suitable for being carried in a jacket, shirt or pants pocket.

Although a coil not having a magnetic core can be made thin by forming a concentric spiral coil 1 as shown in FIG. 2A, the coil characteristics are lowered when a coin 10 or aluminum foil in a cigarette case in a person's pocket overlaps perpendicularly with the axis of a transponder 2 having such a coil 1, as shown in FIG. 2B. Such a characteristic deterioration can be prevented with significant inconvenience by taking the transponder out of the pocket when using it. Further, such a use may cause the deterioration of characteristics due to attached water drops or snow.

When a magnetic core is used with an alternating losses resulting from eddy currents have been prevented by layering thin magnetic plates having high electric resistance while insulating the plates from one another. Such an effect is more greatly enhanced with a higher electric resistance and a smaller thickness of the magnetic material. However, at a frequency exceeding a few dozen kHz, and in particular, a few hundred kHz, a significant loss is produce and thus it is not suitable for use even if a material is used which has the highest electric resistance and the smallest thickness and is industrially available, i.e., an amorphous metal having an electric resistance of 137 $\mu\Omega cm$ and a thickness of $23\mu$.

SUMMARY OF THE INVENTION

It is an object of the present invention to provide a transponder and antenna, which is thin and flexible, has low loss at high frequency, and is insignificantly affected by a coin or an aluminum foil such as that used for cigarette packaging.

An antenna for a transponder in accordance with a first embodiment of the present invention comprises a magnetic core composed of layered rectangular metallic thin plates, and a coil wound parallel to a greater dimension of the magnetic core.

Because the magnetic core in such an antenna for a transponder is composed of layered metallic thin plates, the antenna is thin and flexible, and has a decreased high-frequency loss. By winding a coil in the parallel with a longer dimension of the magnetic core, the loss is significantly decreased at a high frequency region over a few dozen kHz.

When the antenna for the transponder is mounted in a transponder, the magnetic flux flows parallel to the transponder's plane. Thus, the magnetic flux is barely affected by a coin or aluminum foil overlapped on the transponder's plane.

A transponder in accordance with a second embodiment of the present invention has two plate antennas each comprising a magnetic core composed of layered metallic thin plates wound with a conductor coil, and an air-core antenna composed of a spirally wound conductor.

An antenna for a transponder in accordance with a third embodiment of the present invention comprises a plate magnetic core composed of a composite material of a soft magnetic flake and a synthetic resin, and a coil wound on such a magnetic core.

Such an antenna for a transponder is thin and flexible and has a decreased high-frequency loss, because the magnetic core is composed of a composite material such as a soft magnetic flake and a synthetic resin.

When the antenna for the transponder is fabricated in a transponder, the magnetic flux flows parallel to the transponder plate. Thus, the magnetic flux is barely affected by a coin or aluminum foil overlapped on the transponder plate.

A transponder in accordance with a fourth embodiment of the present invention comprises two plate antennas in accordance with the third embodiment set forth above, and an air-core antenna composed of a spirally wound conductor.

DESCRIPTION OF THE PREFERRED EMBODIMENTS

A transponder antenna in accordance with a first embodiment of the present invention will now be explained.

Figure 1:
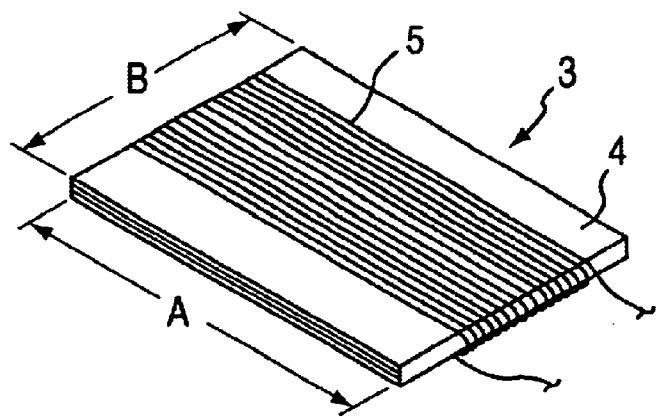
FIG. 1 is an isometric view illustrating a first antenna in accordance with an embodiment of the present invention.

FIG. 1 is an isometric view illustrating a preferable feature of an antenna in accordance with the first embodiment of the present invention.

This antenna comprises a magnetic core 4 composed of layered metallic thin plates, and a coil 5 wound thereon.

Preferred materials for the metallic thin plate are soft magnetic materials, and in particular, of having excellent magnetic properties and a large specific resistance. Examples of such materials include amorphous magnetic materials, such as METAGLAS 2714A (Co—Fe—Ni—B—Si type), 2605S2 (Fe—B—Si type), 2605SC (Fe—B—Si—C type) and 2876MB (Fe—Ni—Mo—B type) made by Allied Signal; iron-nickel alloys, such as JIS 2531 PB PC; silicon steels, such as JIS 2553 Z6H and RC6HL GO9 SO9; and the like. Among them, Co—Fe—Ni—B—Si-type amorphous magnetic material is more preferred, and the preferable thickness of each metallic thin plate ranges 20 to 50 µm.

The number of the layered metallic thin plates is preferably 3 to 16. Although only metallic thin plates can be layered without inserting other material, metallic thin plates which are insulated by coating or oxidizing the surface of the plate also may be layered. Further, in order to secure the insulation between the metallic thin plates, an insulating material, such as paper and polymeric films may be inserted between the metallic thin plates in the layering.

The ratio B/A of the shorter side length B to the longer side length A in the magnetic core 4 composed of layered metallic thin plate is 1 or less, preferably 0.4 to 1.0 and more preferably 0.5 to 0.9.

The conductor wound up as the coil 5 is preferably 100 to 200 µm in diameter. When the coil 5 is formed, the conductor is wound up in the direction parallel to a greater dimension of the magnetic core 4. The preferable thickness of the antenna 3 after the coil is wound up is 0.4 mm or less, and preferably 0.3 mm or less.

The cross-section of the conductor for the coil is typically circular, and is preferably rectangular for the compact coil. The materials for the conductor are pure copper for general use, chromium copper (copper-base alloy containing chromium) for use requiring the strength due to vibration, highly conductive silver for compact size, corrosion resistive gold for use requiring high reliability, and aluminum for light weight.

The magnetic core of the antenna in accordance with the present invention is flexible in order to prevent breakage due to bending. Further, because the antenna is thin and the coil axis can be set to be parallel to the transponder plate, its characteristics are barely lowered when a coin or aluminum foil overlaps with the transponder. Thus, the antenna has a small loss at a high frequency.

Figure 3A:
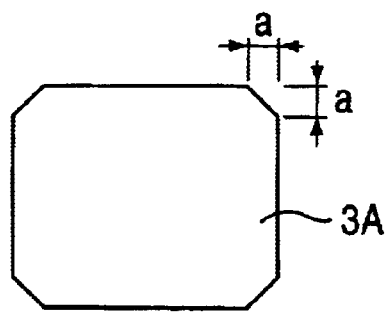
FIGS. 3A and 3B are plan views illustrating a magnetic core in accordance with an embodiment of the present invention.
Figure 3B:
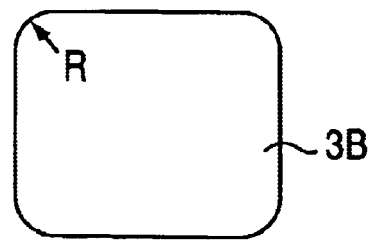

In particular, when the corners of the magnetic core are reduced to from oblique angles or rounded as shown in FIGS. 3A and 3B and in Examples described after, the loss can be further suppressed at a high frequency. The loss in the antenna in accordance with the present invention, of which the coil is wound up with the magnetic core composed of layered metallic thin plates parallel to a greater dimension longer side direction, is significantly lowered at a high frequency region of a few dozen kHz, and the most of the loss is generated at the corners of the magnetic core. Thus, the corners are reduced to from oblique angles or rounded like a magnetic core 3A shown in FIG. 3A or core 3B shown in FIG. 3B, respectively, to decrease the loss.

When the corners are reduced to from oblique angles, the length of the cut side (a in FIG. 3A) is generally 2 to 12 mm, preferably 3 to 10 mm, and more preferably 4 to 8 mm. When the corners are rounded, the curvature radius R is generally 2 to 15 mm, preferably 3 to 12 mm, and more preferably 4 to 10 mm.

Next, a transponder and antenna according to a second embodiment of the present invention will be explained.

The transponder in accordance with the present invention is produced by embedding the antenna 3 for the transponder, as well as a circuit chip, into a synthetic resin. The preferred size of the transponder is 54 mm in width and 86 mm in length, similar to credit cards generally used. A size greater than this is too bulky to carry, whereas a size less than this may often be lost, both resulting in inconvenient handling. The preferred thickness of the transponder is 0.76 mm or less, similar to credit cards.

Figure 4A:
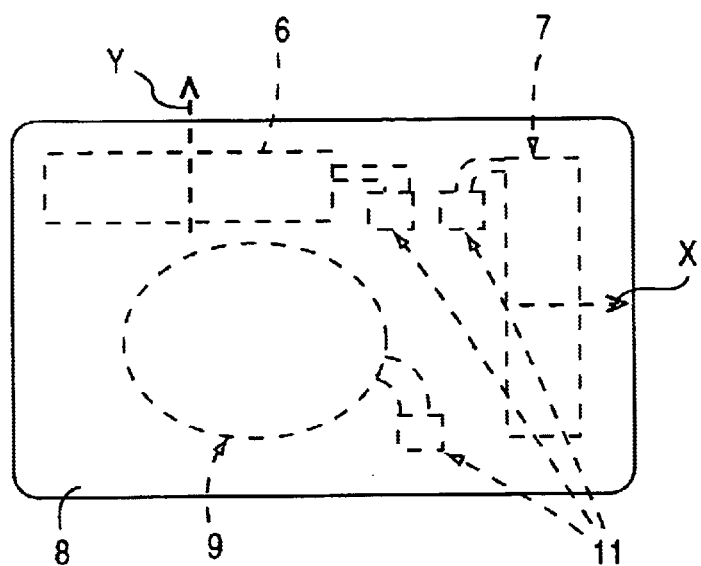
FIG. 4A is a plan view illustrating a transponder in accordance with an embodiment of the present invention and FIG. 4B is an isometric view of the same.
Figure 4B:
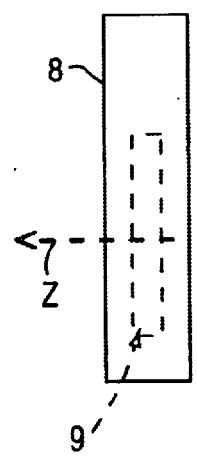

As shown in FIGS. 4A and 4B, the plate transponder 8 in accordance with the present invention is provided with two thin plate antennas 6, 7, while their coil axes (or antenna axes) are perpendicular to one another, and an air-core antenna composed of an air-core spiral coil 9 is provided in the transponder 8, so that the axis is perpendicular to the transponder plate. Axes of the antennas 6, 7 and of the antenna composed of the coil 9 are preferably directed in three directions perpendicular to each other. These antennas have chip circuits 11.

When the transponder is used as an ID card or a commuter pass for an automated wicket in a pocket, the transponder must respond to radio waves from any direction, because the correlation of the directions between the antenna of the interrogator and the transponder is not defined. Although the plate transponder can respond to all the directions parallel to the plate by providing two plate antennas which cross their axes, such a transponder cannot respond to the plane perpendicular to the plate. Further, the spiral antenna cannot respond to the direction parallel to the plate. On the other hand, the plate transponder shown in FIGS. 4A and 4B can respond to radio waves from all the directions, regardless of the direction of the transponder; the antenna 7 responds to radio waves in the X direction, the antenna 6 responds to radio waves in the Y direction, and the air-core antenna (coil) 9 responds to radio waves in the Z direction.

Figure 5A:
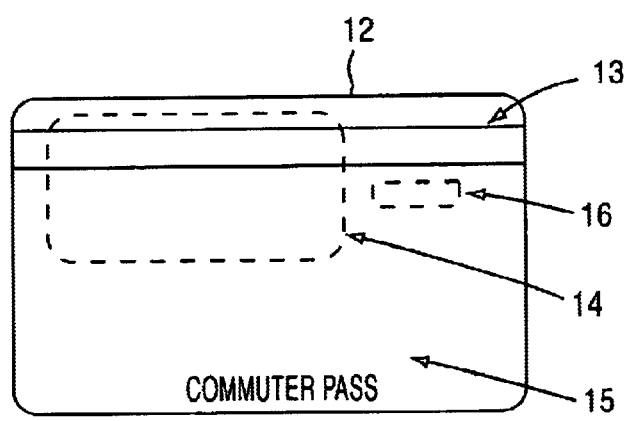
FIG. 5A is a plan view illustrating a transponder also usable as a magnetic card and FIG. 5B is a side view of the same.
Figure 5B:
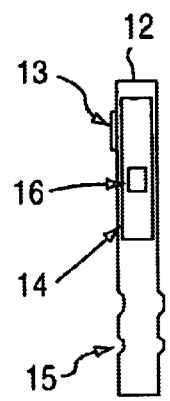

The transponder 12 may be provided with a magnetic recording layer, such as a magnetic stripe 13, at the surface, and the antenna 14 in accordance with the present invention as shown in FIGS. 5A and 5B. The transponder can be used in both the contact and non-contact states. Any printing may be applied on the surface without magnetic recording for visual judgement. Any embossment can be formed at the sections other than the antenna, circuit and magnetic recording layer for clearer printing and improving the durability against rewrite and wear. The transponder 12 has a circuit chip 16.

An antenna for a transponder in accordance with a third embodiment will now be explained.

Examples of soft magnetic materials used for the flake of the antenna for the transponder in accordance with a third embodiment of the present invention include pure iron, silicon steel, permalloys (Fe—Ni alloy), iron/cobalt amorphous alloys, and in particular, cobalt amorphous alloys (Co—Fe—Ni—B—Si). Amorphous alloys have excellent high-frequency characteristics, and are readily formed to flakes by striking to quench the molten drops from the molten alloy flow on a copper surface cooled with water.

The thickness of the flake is preferably 30 µm or less, and more preferably 10 µm or less, to prevent the effect of eddy current. A larger flake diameter can increase the permeability of the composite material and decrease the magnetic core size. However, an excessively large diameter of the flake barely homogenizes the magnetic core material. Accordingly, flake diameter ranges 50 to 2,000 µm, and preferably 100 to 1,000 µm.

Examples of synthetic resins include thermoset resins, e.g. epoxy resins, phenol resins, urea resins, unsaturated polyester resins, diacrylphthalate resins, melamine resins, silicone resins, and polyurethane resins; and thermoplastic resins, e.g. polyethylene resins, polypropylene resins, vinyl chloride resins, fluoroplastics, methacrylate resins, polystyrene resins, AS resins, ABS resins, ABA resins, polycarbonate resins, polyacetal resins, and polyimide resins.

The flexibility of the composite material increases and the shaping characteristics improves with the increased synthetic resin content in the composite material. When the resin content is too small, the strength of the composite material decreases. On the other hand, an excessive synthetic resin content causes a decrease in permeability. Accordingly, the preferable amount of the synthetic resin is 3 to 50% by weight, and more preferably 10 to 40% by weight of the composite material.

Usable molding methods include injection molding, compression molding, rolling, and doctor blade shaping. A composite material having excellent magnetic characteristics can be obtained by compression molding, rolling or doctor blade shaping, since the flake plane is oriented to the plane of the composite material. The size suitable to carry is 0.3 to 2 mm in thickness, 100 mm or less in width and length, and in particular, 0.3 to 1 mm in thickness, 10 to 25 mm in width, and 60 to 80 mm in length.

When the conductor forming the coil is too thick, the antenna becomes too thick, whereas the excessively thin conductor causes an increase in resistance. Thus, the diameter of the conductor preferably ranges 100 to 200 $\mu$m.

It is preferred that the coil is wound perpendicular to the longer side of the antenna, in other words, the coil axis is parallel to the longer side.

The antenna for the transponder in accordance with the present invention exhibits excellent effects in that the antenna is thin and flexible, the loss is low at a high frequency over 100 kHz, and the antenna is less affected by a coin or an aluminum foil package.

A transponder using an antenna in accordance with a fourth embodiment of the present invention will now be explained.

Figure 7A:
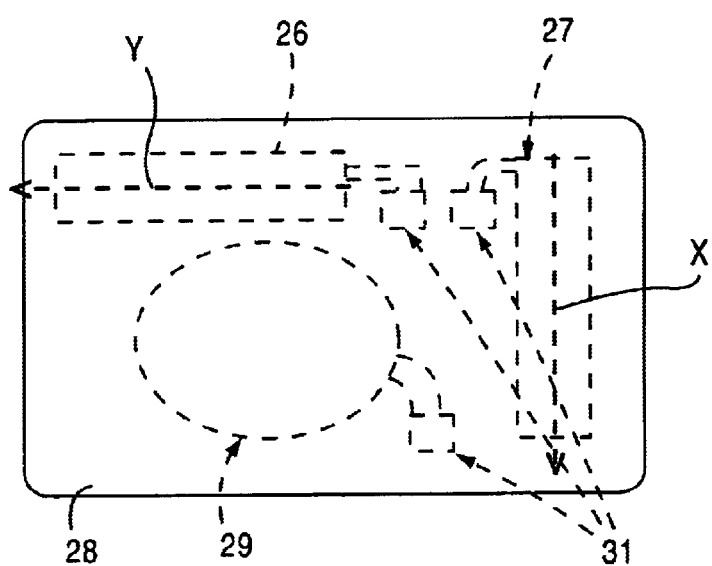
FIG. 7A is a plan view illustrating a transponder in accordance with an embodiment of the present invention.
Figure 7B:
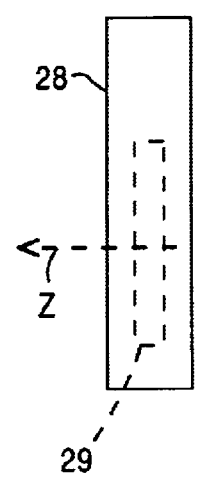
FIG. 7B is a side view of the same.

In this transponder, two plate antennas in accordance with the third embodiment are placed perpendicular to each other, and an air-core antenna composed of a spirally wound conductor is placed, similar to the second embodiment set forth above, because the direction of the transponder antenna is not always oriented in the direction of the magnetic flux of the reading machine when the transponder in a pocket passes through an automated wicket. As shown in FIGS. 7A and 7B, the two thin plate antennas 26, 27 in accordance with the present invention are provided in the plate transponder 28 so as to cross the axes of the coils or antennas of each other, and the air-core antenna composed of the air-core spiral coil 29 is provided in the plate transponder 28 so that the axis of the antenna is perpendicular to the plate of the transponder. Axes of the antennas 26, 27 and of the antenna composed of the coil 29 are preferably directed to three directions perpendicular to each other. These antennas have chip circuits 31.

When the transponder is used as an ID card or an automated wicket in the pocket, the correlation between the direction of the interrogator antenna and the direction of the transponder is not fixed. Thus, the transponder must respond to radio waves from all the directions. A transponder, which has two plate antennas crossing each other, can respond to the direction parallel to the plate, but cannot respond to the direction perpendicular to the plate. On the other hand, the plate transponder shown in FIGS. 7A and 7B can respond to waves from all the directions, regardless the direction of the transponder; the antenna 27 responds to radio waves in the X direction, the antenna 26 responds to radio waves in the Y direction, and the air-core antenna (coil) 29 responds to radio waves in the Z direction.

Experiment 1

A sheet composed of Allied Signal METAGLAS 2714A having a width of 50 mm and a thickness 25 $\mu$m was used as a magnetic core material. The sheet was cut into a size shown in Table 1, was heated at 250° C. for 10 min. in air, and quenched. A magnetic core was produced by layering a few sheets so as to reach the thickness shown in Table 1. An insulation conductor having a diameter of 0.15 mm was wound up on the magnetic core so that the L of the coil is approximately 3 mH. The conductor was wound in the direction parallel to the longer side of the magnetic core in Examples, and in the direction parallel to the shorter side of the magnetic core in Comparative Examples.

The resistance of each antenna due to the magnetic core was evaluated by the following equation from the resistance R obtained from Yokogawa-Hewlett-Packard LCR meter 4284A:

$$R_1 = R - R_2$$

wherein $R_1$ represents a resistance due to the magnetic core, R represents an observed resistance, and $R_2$ represents a direct current resistance of the coil.

Results are shown in Table 1. Table 1 demonstrates that the resistance significantly decreases by winding the coil in the direction parallel to the longer side of the magnetic core.

Figure 6A:
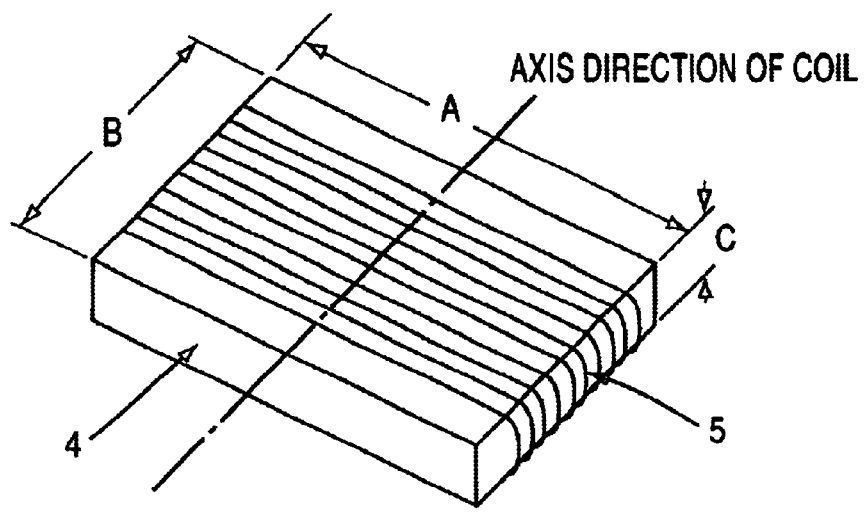
FIGS. 6A and 6B are representative views illustrating the length, width and thickness of coils in Example (6A) and Comparative Example (6B)
Figure 6B:
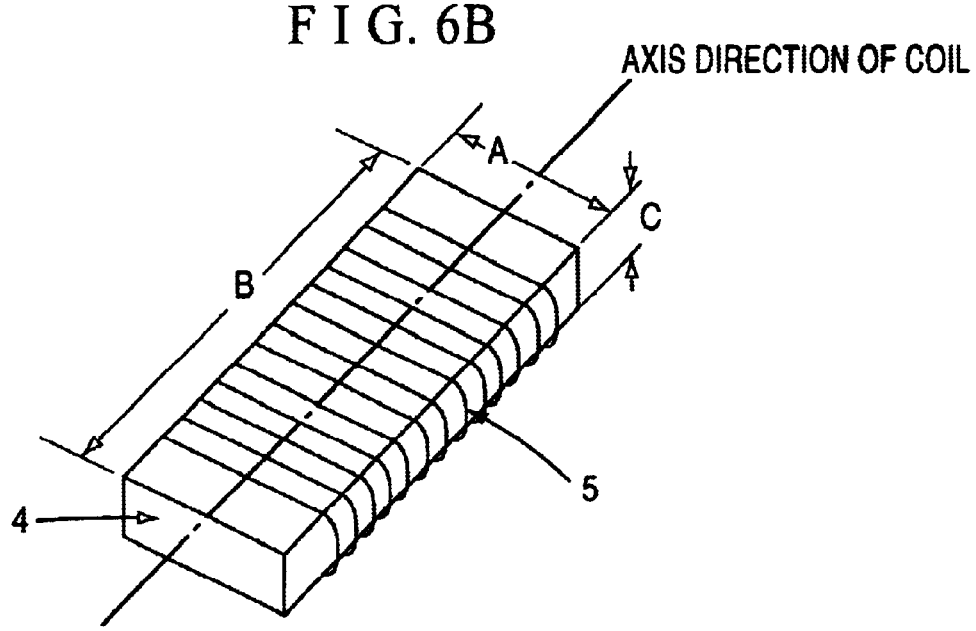

As shown in FIGS. 6A and 6B, the magnetic core size perpendicular to coil axis represents A, the magnetic core size parallel to coil axis represents B, and the magnetic core size perpendicular to the plane AB represents C.

Experiment 2

A sheet composed of Allied Signal METAGLAS 2714A having a width of 50 mm and a thickness 25 $\mu$m was cut into 50 mm by 25 mm. Four corners of the cut sheet in Example A were cut as shown in FIG. 3A (a=6 mm). Four corners of the cut sheet in Example B were rounded as shown in FIG. 3B so as to form arcs (R=6 mm). Each corner in Example C was maintained to right angle. Sheets were heated at 250° C. for 10 min. in air, and quenched. A magnetic core of each Example was produced by layering three sheets. An insulation conductor having a diameter of 0.15 mm was wound up twice by each 85 turns in the direction parallel to the longer side of the magnetic core to form an antenna. The direct current resistance of the coil was 20.4Ω.

The resistance of each antenna due to the magnetic core was evaluated similar to Experiment 1. Results are shown in Table 2. Table 2 demonstrates that the resistance significantly decreases by eliminating the corners of the magnetic core.

Experiments 3

EXAMPLE

A sheet composed of Allied Signal METAGLAS 2714A having a width of 50 mm and a thickness 0.025 mm was cut into 50 mm by 25 mm, heated at 250° C. for 10 min. in air, and quenched. A magnetic core was produced by layering three sheets. An insulation conductor having a diameter of 0.16 mm was wound up by 180 turns in the direction parallel to the longer side of the magnetic core.

COMPARITIVE EXAMPLE

On the other hand, an antenna composed of an air-core coil of which a conductor having a diameter of 0.016 mm was wound to 400 turns.

(Measurement)

Figure 2A:
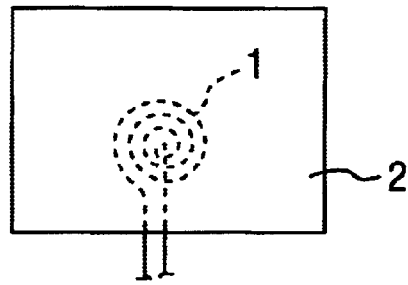
FIG. 2A is a plan view illustrating a transponder having a prior art antenna and FIG. 2B is an isometric view of the same.
Figure 2B:
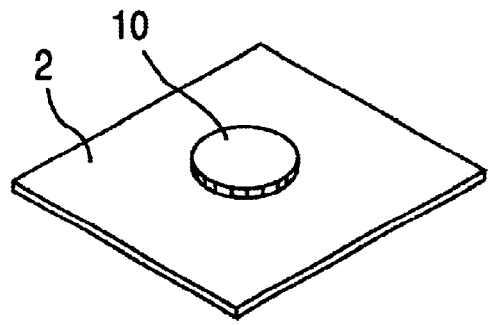

The resistance of the magnetic core of each sample, of which a 10-yen coin was placed in the coil center as shown in FIG. 2B, was measured similar to Experiments 1 and 2. Results are shown in Table 3. Table 3 demonstrates that the antenna of the Example exhibits a smaller resistance in a practical frequency region as a transponder of 40 to 200 kHz.

Experiment 4

EXAMPLES

No. 1

A magnetic core material was prepared by mixing Co-type amorphous metal flakes having an average thickness of 5 $\mu$m and an average diameter of 500 $\mu$m with an epoxy resin in an amount of 10% (the rate of the resin to the total of the flake and resin) and by compression-molding at 160° C. and 200 kg/cm². The magnetic core material was cut into cut sheets having a thickness of 0.6 mm, a width of 25 mm, and a length of 80 mm. A conductor having a diameter of 0.15 mm was wound in the direction parallel to the cut sheet so that L is 3 mH.

No. 2

A magnetic core material was prepared by mixing Co-type amorphous metal flakes having an average thickness of 5 μm and an average diameter of 500 μm with an epoxy resin in an amount of 20% (the rate of the resin to the total of the flake and resin) and by compression-molding at 160° C. and 200 kg/cm². The magnetic core material was cut into cut sheets having a thickness of 0.6 mm, a width of 25 mm, and a length of 80 mm. A conductor having a diameter of 0.15 mm was wound in the direction parallel to the cut sheet so that L is 3 mH.

No. 3

A magnetic core material was prepared by mixing Co-type amorphous metal flakes having an average thickness of 5 μm and an average diameter of 500 μm with an epoxy resin in an amount of 30% (the rate of the resin to the total of the flake and resin) and by compression-molding at 160° C. and 200 kg/cm². The magnetic core material was cut into cut sheets having a thickness of 0.6 mm, a width of 25 mm, and a length of 80 mm. A conductor having a diameter of 0.15 mm was wound in the direction parallel to the cut sheet so that L is 3 mH.

No. 4

A magnetic core material was prepared by mixing Co-type amorphous metal flakes having an average thickness of 5 μm and an average diameter of 500 μm with an epoxy resin in an amount of 40% (the rate of the resin to the total of the flake and resin) and by compression-molding at 160° C. and 200 kg/cm². The magnetic core material was cut into cut sheets having a thickness of 0.6 mm, a width of 25 mm, and a length of 80 mm. A conductor having a diameter of 0.15 mm was wound in the direction parallel to the cut sheet so that L is 3 mH.

No. 5

A magnetic core material was prepared by mixing Co-type amorphous metal flakes having an average thickness of 5 μm and an average diameter of 300 μm with an epoxy resin in an amount of 20% (the rate of the resin to the total of the flake and resin) and by compression-molding at 160° C. and 200 kg/cm². The magnetic core material was cut into cut sheets having a thickness of 0.6 mm, a width of 25 mm, and a length of 80 mm. A conductor having a diameter of 0.15 mm was wound in the direction parallel to the cut sheet so that L is 3 mH.

No. 6

A magnetic core material was prepared by mixing Co-type amorphous metal flakes having an average thickness of 10 μm and an average diameter of 500 μm with an epoxy resin m an amount of 20% (the rate of the resin to the total of the flake and resin) and by compression-molding at 160° C. and 200 kg/cm². The magnetic core material was cut into cut sheets having a thickness of 0.6 mm, a width of 25 mm, and a length of 80 mm. A conductor having a diameter of 0.15 mm was wound in the direction parallel to the cut sheet so that L is 3 mH.

No. 7

A magnetic core material was prepared by mixing Co-type amorphous metal flakes having an average thickness of 5 μm and an average diameter of 500 μm with a mixture of a urethane resin and an epoxy resin in an amount of 20% (the rate of the resin mixture to the total of the flake and resin mixture) and by compression-molding at 160° C. and 200 kg/cm². The magnetic core material was cut into cut sheets having a thickness of 0.6 mm, a width of 25 mm, and a length of 80 mm. A conductor having a diameter of 0.15 mm was wound in a direction parallel to the cut sheet so that L is 3 mH.

COMPARATIVE EXAMPLE

No. 1

A magnetic core material was prepared by cutting Allied Chemical METAGLAS 2714A into a rectangular pieces having a width of 25 mm and a length of 50 mm. A magnetic core having a thickness of 0.3 mm was produced by layering 12 pieces. A conductor having a diameter of 0.15 mm was wound in the direction parallel to the cut sheet so that L is 3 mH.

(Measurement)

The resistance R (loss) of each coil was measured with a Yokogawa-Hewlett-Packard LCR meter. Results are shown in Table 4.

Table 4 demonstrates that the antenna in accordance with the present invention exhibits a small loss in a high frequency region over 100 kHz.

TABLE 1

| | Magnetic Core Size | | | | Resistance due to Magnetic Core $R_1$ (Ω) | | | | | | | | |
|---|---|---|---|---|---|---|---|---|---|---|---|---|---|
| | A (mm) | B (mm) | C (μ) | B/A | 30 kHz | 40 kHz | 50 kHz | 60 kHz | 80 kHz | 100 kHz | 120 kHz | 150 kHz | 250 kHz |
| Examples | 50 | 15 | 300 | 0.3 | 1.5 | 2.1 | 3.8 | 5.9 | 10.3 | 16.5 | 24.4 | 40.8 | 84.3 |
| | 50 | 20 | 300 | 0.4 | 2.3 | 4.1 | 5.8 | 8.5 | 14.7 | 23.0 | 26.4 | 48.2 | 98.8 |
| | 50 | 25 | 75 | 0.5 | 2.3 | 4.3 | 6.7 | 9.7 | 17.2 | 26.0 | 38.9 | 60.8 | 108 |
| | 50 | 25 | 150 | 0.5 | 2.4 | 4.8 | 7.3 | 10.1 | 17.5 | 26.8 | 37.8 | 56.2 | 106 |
| | 50 | 25 | 300 | 0.5 | 2.7 | 4.7 | 6.6 | 9.2 | 15.8 | 24.1 | 33.8 | 52.3 | 96.3 |
| | 50 | 25 | 600 | 0.5 | 2.7 | 4.8 | 6.4 | 8.6 | 14.9 | 23.5 | 32.4 | 49.6 | 92.3 |
| | 50 | 35 | 300 | 0.7 | 5.9 | 10.4 | 16 | 23.3 | 42.8 | 70.9 | 114 | 224 | 840 |
| | 50 | 50 | 300 | 1.0 | 9.9 | 17.7 | 28.2 | 41.6 | 77.5 | 134 | 224 | 480 | 2500 |
| Comparative Examples | 50 | 75 | 300 | 1.5 | 10.8 | 25.1 | 38.0 | 80.7 | 103 | 162 | 281 | 816 | 4250 |
| | 50 | 100 | 300 | 2.0 | 12.7 | 28.8 | 48.9 | 72.5 | 115 | 194 | 335 | 910 | 5650 |
| | 50 | 200 | 300 | 4.0 | 16.6 | 30.1 | 59.7 | 94.3 | 140 | 253 | 440 | 1030 | 7400 |

Remarks
A: Magnetic core size perpendicular to coil axis
B: Magnetic core size parallel to coil axis
C: Thickness

TABLE 2

| Frequency (kHz) | Example A Core with Cut Corner (Ω) | Example B Core with Rounded Corner (Ω) | Example C Core without Corner Treatment (Ω) |
| --- | --- | --- | --- |
| 30 | 2.1 | 2.2 | 2.7 |
| 40 | 3.7 | 3.8 | 4.4 |
| 50 | 3.5 | 3.7 | 4.8 |
| 60 | 5.7 | 6.0 | 7.8 |
| 80 | 13.9 | 14.5 | 17.6 |
| 100 | 23.7 | 24.7 | 29.4 |
| 120 | 37.7 | 39.2 | 46.6 |
| 150 | 54.1 | 56 | 65.8 |
| 200 | 108.6 | 112.3 | 134.1 |

TABLE 3

| Frequency (kHz) | Example Coil with Core Core Diameter 0.16 mm Number of Turns 180 (Ω) | Comparative Example Air-core Coil Conductor Diameter 0.16 mm Number of Turns 400 (Ω) |
| --- | --- | --- |
| 30 | 6.2 | 20.0 |
| 40 | 8.8 | 23.3 |
| 50 | 11.6 | 26.4 |
| 60 | 14.8 | 29.5 |
| 80 | 21.7 | 35.3 |
| 100 | 29.9 | 41.2 |
| 120 | 39.0 | 47.1 |
| 150 | 55.6 | 56.3 |
| 200 | 70.0 | 73.1 |

TABLE 4

| | Resiostance R (Ω) | | | | | | | |
| --- | --- | --- | --- | --- | --- | --- | --- | --- |
| Frequency kHz | Example No. 1 | Example No. 2 | Example No. 3 | Example No. 4 | Example No. 5 | Example No. 6 | Example No. 7 | Comp. Ex. No. 1 |
| 50 | 29.3 | 30.8 | 31.3 | 32.7 | 31.0 | 30.8 | 30.7 | 23.7 |
| 80 | 29.5 | 31.0 | 31.8 | 32.3 | 31.4 | 31.6 | 31.4 | 26.1 |
| 100 | 29.8 | 31.3 | 32.8 | 33.1 | 31.9 | 30.7 | 31.3 | 29.4 |
| 120 | 33.4 | 33.4 | 33.5 | 33.4 | 33.3 | 33.7 | 33.2 | 46.6 |
| 150 | 38.1 | 36.6 | 38.9 | 38.6 | 39.1 | 39.4 | 38.9 | 65.8 |
| 200 | 76.6 | 54.3 | 48.8 | 43.5 | 54.9 | 57.0 | 53.6 | 134.1 |
| 250 | 125.0 | 73.0 | 85.7 | 61.6 | 73.8 | 80.3 | 71.9 | 201.2 |
| 300 | 193.3 | 110.1 | 106.8 | 80.9 | 110.7 | 132.1 | 113.1 | 301.7 |
| 400 | 395.0 | 271.6 | 121.5 | 87.0 | 274.1 | 353.1 | 271.0 | 452.6 |
| 500 | 1243.3 | 914.3 | 583.9 | 413.6 | 913.5 | 1280.0 | 936.4 | 1678.9 |

What is claimed is:

1. An antenna for a transponder comprising a three-dimensional magnetic core composed of a single stack of rectangular metallic thin plates, and a coil having windings wound on said magnetic core such that said windings are arranged parallel to a greatest rectangular dimension of said plates forming said magnetic core.

2. An antenna for a transponder according to claim 1, wherein corners of said thin plates are rounded.

3. An antenna for a transponder according to claim 1, wherein said thin plates comprise an amorphous magnetic material.

4. An antenna for a transponder according to claim 1, wherein the thickness of each one of said thin plates is 20 to 50 μm.

5. An antenna for a transponder according to claim 1, wherein said magnetic core comprises three to sixteen of said thin plates.

6. An antenna for a transponder according to claim 1, wherein said thin plates are insulated from one another by oxidizing each of their surfaces.

7. An antenna for a transponder according to claim 1, wherein the diameter of a conductor comprising said coil is 100 to 200 μm.

8. An antenna for a transponder according to claim 1, wherein the thickness of the antenna is 0.4 mm or less.

9. An antenna for a transponder according to claim 1, wherein said antenna for a transponder is a size suitable for use as at least one of an ID card, a commuter pass and a coupon ticket which operates at a frequency of 40 to 200 kHz.

10. The antenna for a transponder according to claim 1, wherein each corner of said thin plates is reduced to form an oblique angle.

11. An antenna for a transponder comprising a three-dimensional rectangular plate magnetic core comprising a single stack of rectangular metallic thin plates, each plate composed of a composite material of soft magnetic flakes and a synthetic resin, and a coil having windings wound on said magnetic core such that said windings are arranged perpendicular to a greatest rectangular dimension of the magnetic core.

12. An antenna for a transponder according to claim 11, wherein the soft magnetic material composing each one of said flakes is selected from the group consisting of pure iron, silicon steel, a permalloy and an iron/cobalt amorphous alloy.

13. An antenna for a transponder according to claim 12, wherein the soft magnetic material composing each one of said flakes is a cobalt amorphous alloy.

14. An antenna for a transponder according to claim 11, wherein each one of said flakes has a thickness of 30 μm or less and a diameter of 50 to 2,000 μm.

15. An antenna for a transponder according to claim 11, wherein each one of said flakes has a thickness of 10 μm or less and a diameter of 100 to 1,000 μm.

16. An antenna for a transponder according to claim 11, wherein said synthetic resin is selected from the group consisting of thermoset resins, including epoxy resins, phenol resins, urea resins, unsaturated polyester resins, diacrylphthalate resins, melamine resins, silicone resins, and polyurethane resins; and thermoplastic resins, including polyethylene resins, polypropylene resins, vinyl chloride resins, fluoroplastics, methacrylate resins, polystyrene resins, AS resins, ABS resins, ABA resins, polycarbonate resins, polyacetal resins, and polyimide resins.

17. An antenna for a transponder according to claim 11, wherein the amount of said synthetic resin in the composite material is 3 to 50% by weight.

18. An antenna for a transponder according to claim 11, wherein said flake comprises a cobalt base amorphous alloy, said synthetic resin is an epoxy resin, and the amount of said synthetic resin in the composite material is 10 to 40% by weight.

19. An antenna for a transponder according to claim 11, wherein said magnetic core has a thickness of 0.3 mm to 1 mm, a width of 10 to 25 mm and a length of 60 to 80 mm.

20. An antenna for a transponder according to claim 11, wherein said magnetic core has a thickness of 0.3 to 1 mm, a width of 10 to 25 mm and a length of 60 to 80 mm.

21. An antenna for a transponder according to claim 11, wherein the diameter of a conductor comprising said coil is 100 to 200 $\mu$m.

22. An antenna for a transponder according to claim 11, wherein said antenna for a transponder is a size suitable for use as at least one of an ID card, a commuter pass and a coupon ticket which operates at a frequency over 100 kHz.

23. An transponder comprising two plate antennas set forth in claim 11, and an air-core antenna composed of a spirally wound conductor, wherein said three antennas have respective axes which are mutually perpendicular to one another.

24. A transponder according to claim 23, wherein the axes of said two or three antennas are perpendicular to each other.

25. A transponder according to claim 23, wherein said two plate antennas are provided in the plate transponder so that the axes of said two coils are perpendicular to each other, and said air-core antenna composed of the spirally wound conductor is provided in the plate transponder so that the axis thereof is perpendicular to the transponder plate.

26. A transponder according to claim 23, wherein said antenna for a transponder is a size suitable for use as at least one of an ID card, a commuter pass and a coupon ticket which operates at a frequency over 100 kHz.

* * * * *